US012129112B2

(12) United States Patent
Giere et al.

(10) Patent No.: US 12,129,112 B2
(45) Date of Patent: Oct. 29, 2024

(54) CARRY CAN LATERAL STABILIZER

(71) Applicant: Oshkosh Corporation, Oshkosh, WI (US)

(72) Inventors: David Giere, Oshkosh, WI (US); Joseph Nelson, Oshkosh, WI (US); Reid Behrens, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/585,891

(22) Filed: Feb. 23, 2024

(65) Prior Publication Data

US 2024/0190650 A1 Jun. 13, 2024

Related U.S. Application Data

(63) Continuation of application No. 17/718,005, filed on Apr. 11, 2022, now abandoned.

(60) Provisional application No. 63/174,123, filed on Apr. 13, 2021.

(51) Int. Cl.
*B65F 3/04* (2006.01)
*B65F 3/02* (2006.01)

(52) U.S. Cl.
CPC ...... *B65F 3/041* (2013.01); *B65F 2003/0279* (2013.01); *B65F 3/046* (2013.01)

(58) Field of Classification Search
CPC ... B65F 3/041; B65F 3/046; B65F 2003/0279
USPC .......................................................... 414/408
See application file for complete search history.

(56) References Cited

U.S. PATENT DOCUMENTS

| | | | |
|---|---|---|---|
| 2,643,011 | A | 6/1953 | Brisson et al. |
| 2,824,655 | A | 2/1958 | Harbers |
| 3,090,512 | A | 5/1963 | Dempster et al. |
| 3,140,787 | A | 7/1964 | Clar |
| 4,547,118 | A | 10/1985 | Pittenger |
| 5,388,950 | A | 2/1995 | Schmahl et al. |
| 7,553,121 | B2 | 6/2009 | Curotto et al. |
| 9,266,672 | B2 | 2/2016 | Stewart et al. |
| 9,809,383 | B2 | 11/2017 | Ford |
| 9,926,134 | B2 | 3/2018 | Ford |
| 2022/0089366 | A1 | 3/2022 | Evans et al. |
| 2022/0219896 | A1 | 7/2022 | Gary et al. |

*Primary Examiner* — James Keenan
(74) *Attorney, Agent, or Firm* — Foley & Lardner LLP

(57) ABSTRACT

A refuse vehicle includes a chassis, a body coupled to the chassis, a lift arm assembly coupled to at least one of the chassis or the body and selectively repositionable between a first position and a second position, a fork tube coupled to the lift arm assembly, a set of bump plates coupled to the fork, and a lateral stabilizer assembly coupled to at least one of the frame or the body. The lift arm assembly includes a first arm, a second arm, and an implement coupled to the first arm and the second arm. The lateral stabilizer assembly includes a lateral stabilizer and a backer plate. The lateral stabilizer assembly is configured to prevent lateral sway of the implement when the lift arm assembly is in the first position by the lateral stabilizer coming in contact with the set of bump plates.

16 Claims, 11 Drawing Sheets

CARRY CAN LATERAL STABILIZER

CROSS-REFERENCE TO RELATED PATENT APPLICATION

This application is a continuation of U.S. patent application Ser. No. 17/718,005, filed Apr. 11, 2022, which claims the benefit of and priority to U.S. Provisional Patent Application No. 63/174,123, filed Apr. 13, 2021, each of which is incorporated herein by reference in its entirety.

BACKGROUND

The present invention relates generally to a refuse vehicle. Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY OF THE INVENTION

One embodiment relates to a refuse vehicle. The refuse vehicle includes a chassis, a body supported on to the chassis, a front bumper, a lift arm assembly selectively movable between a raised position and a lowered position, a fork tube coupled to the lift arm assembly and including a pair of bump plates, and a lateral stabilizer assembly. The lateral stabilizer assembly includes a backer plate coupled to the front bumper, and a pivotal arm coupled to the backer plate and including a curved down stop arranged at an end of the pivotal arm. When the lift arm assembly moves from the raised position to the lowered position, the fork tube engages the pivotal arm and the pivotal arm pivots toward the backer plate. When the fork tube engages the pivotal arm, engagement between the pivotal arm and the pair of bump plates limits lateral movement of the fork tube.

At least one embodiment relates to a refuse vehicle. The refuse vehicle includes a chassis, a body supported on to the chassis, a front bumper, a lift arm assembly selectively movable between a transit position and a raised position, a fork tube coupled to the lift arm assembly and including a pair of bump plates, and a lateral stabilizer assembly. The lateral stabilizer assembly includes a backer plate coupled to the body, and a plate pivotally coupled to the backer plate and including a curved down stop arranged at an end of the plate. When the lift arm assembly is in the transit position, the fork tube engages the is supported within the curved down stop and the plate engages the pair of bump plates to limit lateral movement of the fork tube.

At least one embodiment relates to a lateral stabilizer assembly. The lateral stabilizer assembly includes a backer plate including one or more mounting apertures, a pivotal arm pivotally coupled to the backer plate and including a spring, and a down stop arranged at an end of the pivotal arm. The spring extends along an axis about which the pivotal arm is configured to pivot toward and away from the backer plate. The down stop is configured to support a fork tube of a lift assembly, in a transit position, and engage a pair of bump plates to laterally constrain the fork tube.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle (e.g., a front end loading refuse vehicle, a refuse truck, etc.) includes a lift arm assembly (e.g., an extendable lift arm assembly, a lift arm assembly, etc.). The lift arm assembly is repositionable between a plurality of positions including a stowed position, a working position, and a transit position. The lift arm assembly further includes a fork tube disposed between a first arm and a second arm. The fork tube is configured to be selectively coupled to a lateral stabilizer assembly when the lift arm assembly is repositionable between the plurality of positions. The lateral stabilizer assembly is coupled to the front of the refuse vehicle and configured to support the fork tube when the lift arm assembly is in the transit position. The lateral stabilizer assembly further includes a lateral stabilizer configured to be selectively repositionable between an extended position and a retracted position. The lateral stabilizer is defined to be a spring loaded lateral stabilizer, where a spring repositions the lateral stabilizer between the extended position and the retracted position.

Figure 1:
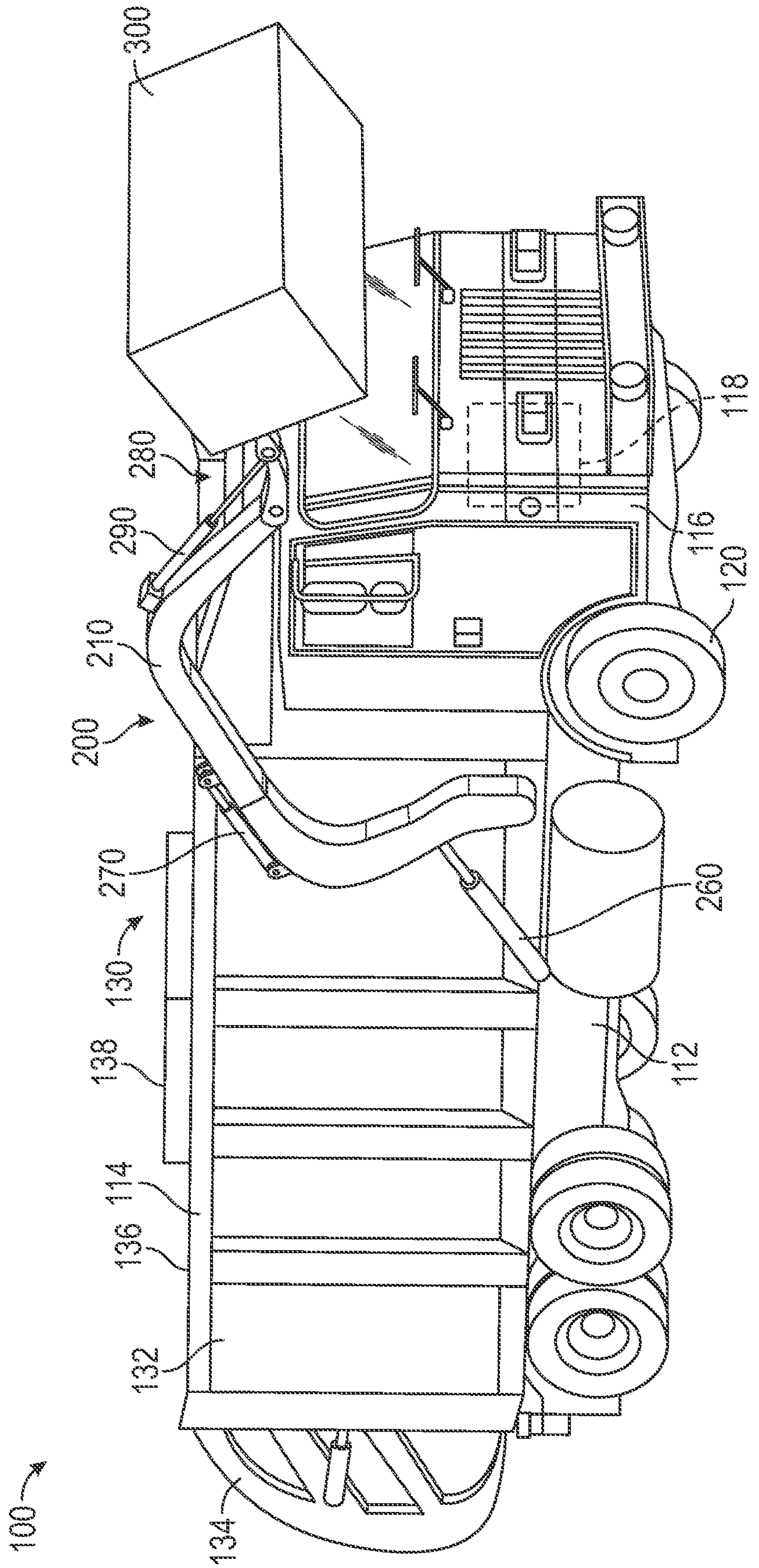
FIG. 1 is a perspective view of a refuse vehicle, according to an exemplary embodiment.

According to the exemplary embodiment shown in FIGS. 1-4, a front end loader, shown as refuse vehicle 100 (e.g., a garbage truck, a waste collection truck, a sanitation truck, etc.), is configured as a front-loading refuse truck having an extendable lift arm assembly, shown as lift arm assembly 200. In other embodiments, the refuse vehicle 100 is configured as a side-loading refuse truck or a rear-loading refuse truck. In still other embodiments, the front end loader is another type of vehicle (e.g., a skid-loader, a telehandler, a plow truck, a boom lift, a construction vehicle, etc.). As shown in FIG. 1, the refuse vehicle 100 includes a chassis, shown as frame 112; a body assembly, shown as body 114, coupled to the frame 112 (e.g., at a rear end thereof, etc.); and a cab, shown as cab 116, coupled to the frame 112 (e.g., at a front end thereof, etc.). The cab 116 may include various components to facilitate operation of the refuse vehicle 100 by an operator (e.g., a seat, a steering wheel, hydraulic controls, a user interface, switches, buttons, dials, etc.). As shown in FIG. 1, the refuse vehicle 100 includes a prime mover, shown as engine 118, coupled to the frame 112 at a position beneath the cab 116. The engine 118 is configured to provide power to a plurality of tractive elements, shown as wheel and tire assemblies 120, and/or to other systems of the refuse vehicle 100 (e.g., a pneumatic system, a hydraulic system, etc.). In other embodiments, the tractive elements include track elements. The engine 118 may be configured to utilize one or more of a variety of fuels (e.g., gasoline, diesel, bio-diesel, ethanol, natural gas, etc.), according to various exemplary embodiments. According to an alternative embodiment, the engine 118 additionally or alternatively includes one or more electric motors coupled to the frame 112 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine driven generator, etc.), and/or from an external power source (e.g., overhead power lines, a charger, etc.) and provide power to the systems of the refuse vehicle 100.

According to an exemplary embodiment, the refuse vehicle 100 is configured to transport refuse from various waste receptacles within a municipality to a storage and/or processing facility (e.g., a landfill, an incineration facility, a recycling facility, etc.). As shown in FIG. 1, the body 114 includes a plurality of panels, shown as panels 132, a tailgate 134, and a cover 136. The panels 132, the tailgate 134, and the cover 136 define a collection chamber (e.g., hopper, etc.), shown as refuse compartment 130. Loose refuse may be placed into the refuse container 300 where it may thereafter be compacted. The refuse compartment 130 may provide temporary storage for refuse during transport to a waste disposal site and/or a recycling facility. In some embodiments, at least a portion of the body 114 and the refuse compartment 130 extend in front of and/or above the cab 116. According to the embodiment shown in FIG. 1, the body 114 and the refuse compartment 130 are positioned behind the cab 116. In some embodiments, the refuse compartment 130 includes a hopper volume and a storage volume. Refuse may be initially loaded into the hopper volume and thereafter compacted into the storage volume. According to an exemplary embodiment, the hopper volume is positioned between the storage volume and the cab 116 (i.e., refuse is loaded into a position of the refuse compartment 130 behind the cab 116 and stored in a position further toward the rear of the refuse compartment 130). In other embodiments, the storage volume is positioned between the hopper volume and the cab 116 (e.g., a rear-loading refuse vehicle, etc.).

As shown in FIGS. 1-4, the lift arm assembly 200 includes a first lift arm, shown as right lift arm 210, coupled to a first side of the body 114 and/or the frame 112, and a second lift arm, shown as left lift arm 212, coupled to an opposing second side of the body 114 and/or the frame 112 such that the right lift arm 210 and the left lift arm 212 extend forward of the cab 116 (e.g., a front-loading refuse vehicle, etc.). In other embodiments, the lift arm assembly 200 extends rearward of the body 114 (e.g., a rear-loading refuse vehicle, etc.). In still other embodiments, the lift arm assembly 200 extends from a side of the body 114 (e.g., a side-loading refuse vehicle, etc.). It should be noted that the description of the left lift arm 212 provided herein with regards to FIGS. 2-4 similarly applies to the right lift arm 210.

Figure 2:
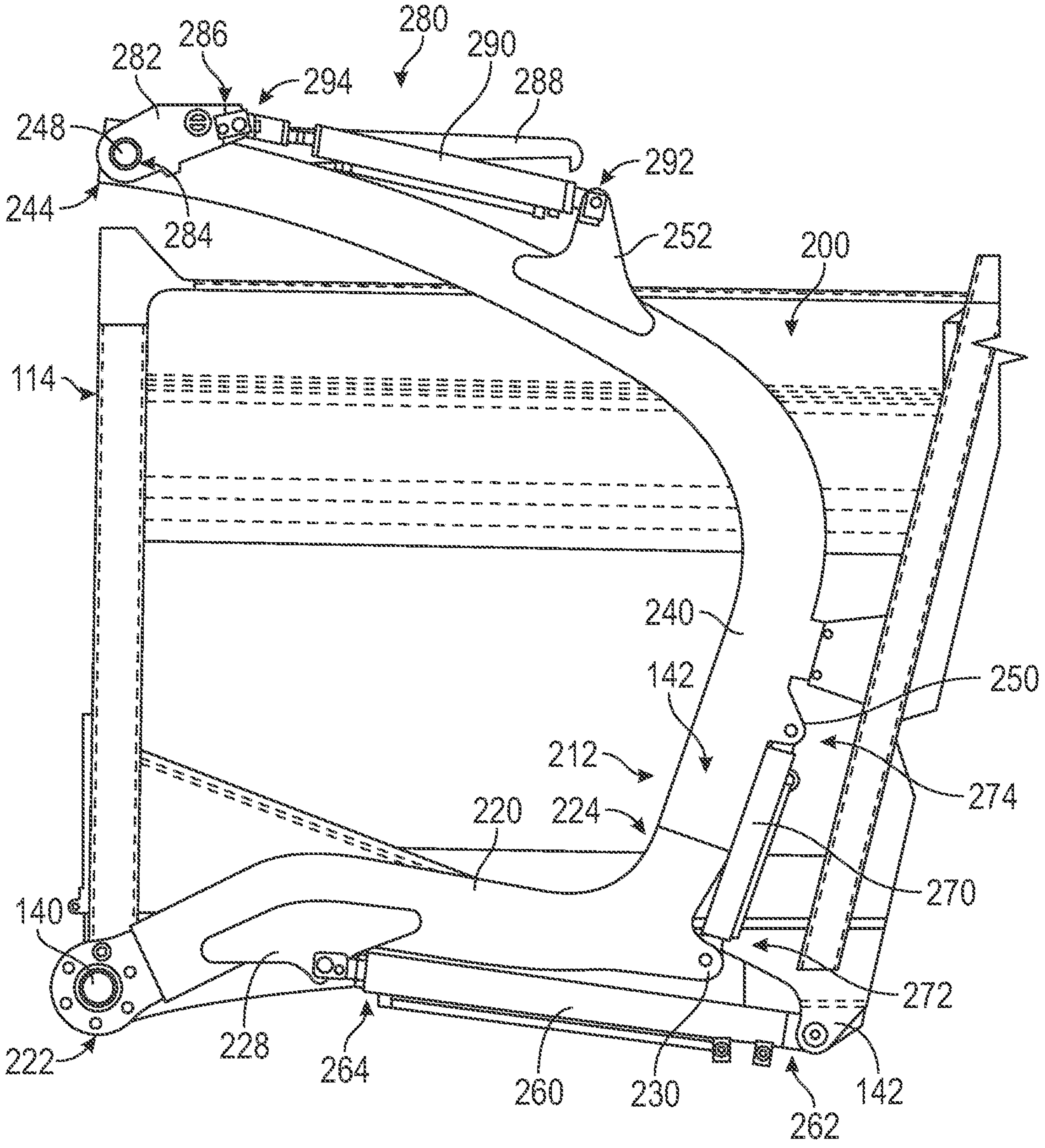
FIG. 2 is a side view of a lift arm assembly in a stowed position, according to an exemplary embodiment.
Figure 3:
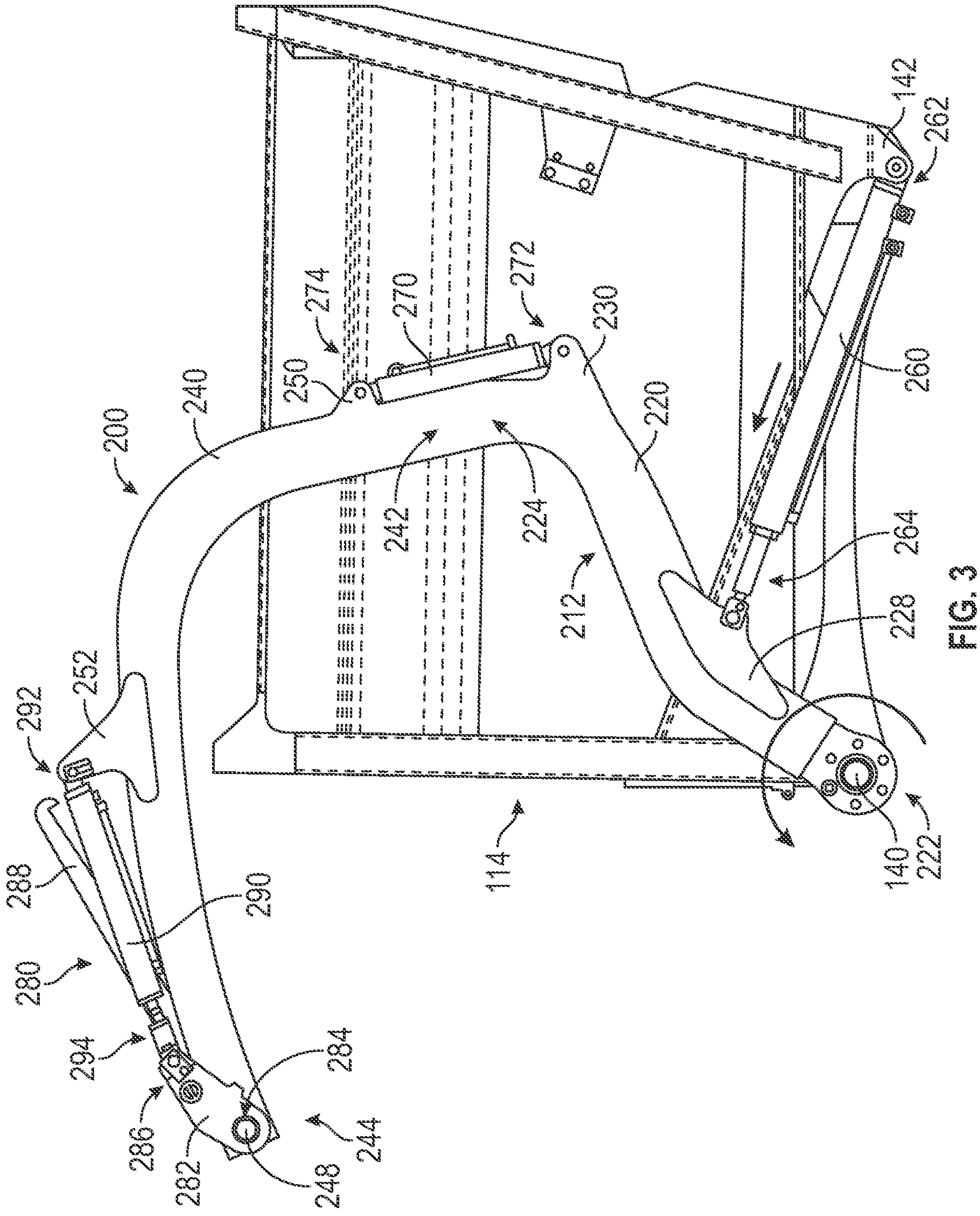
FIG. 3 is a side view of the lift arm assembly of FIG. 2 in an intermediate positon, according to an exemplary embodiment.
Figure 4:
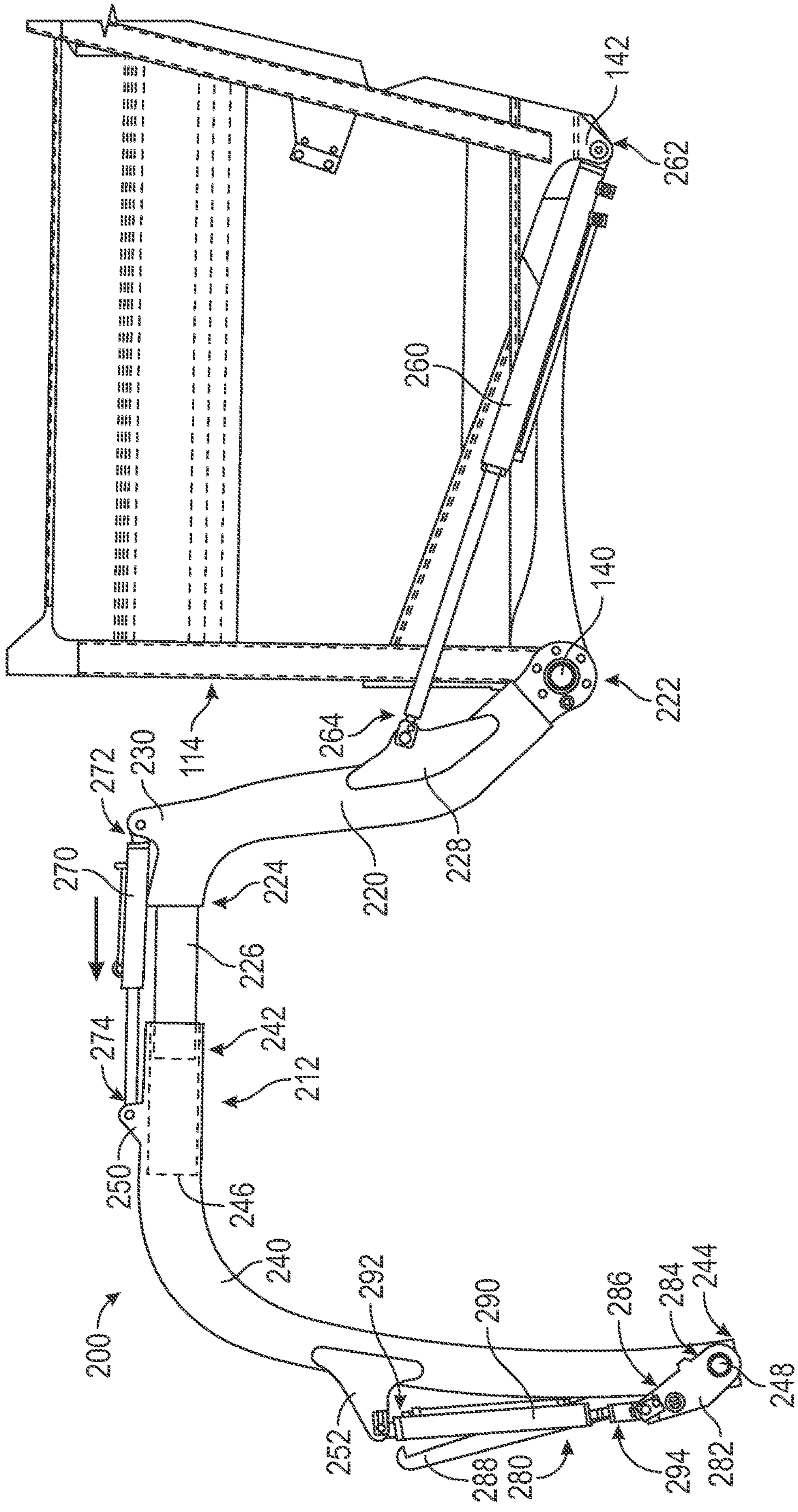
FIG. 4 is a side view of the lift arm assembly of FIG. 2 in a working positon, according to an exemplary embodiment.

As shown in FIGS. 2-4, the left lift arm 212 (and similarly the right lift arm 210) has a plurality of arm portions including at least a first arm portion, shown as first arm portion 220, and a second arm portion, shown as second arm portion 240. In some embodiments, the plurality of arm portions include three or more arm portions (e.g., that are extendable, pivotable, or otherwise repositionable relative to each other at multiple locations/joints therealong, etc.). The first arm portion 220 has a first end, shown as first end 222, pivotally coupled to a side (e.g., the left side, the right side, etc.) of the body 114 and/or the frame 112 at a first pivot point, shown as lift arm pivot 140, and an opposing second end, shown as second end 224. As show in FIG. 4, the second end 224 has a protrusion, shown as projection 226, extending therefrom. As shown in FIGS. 2-4, the first arm portion 220 includes (i) a first coupler, shown as first bracket 228, coupled along the first arm portion 220 between the first end 222 and the second end 224 (e.g., closer to the first end 222, proximate the first end 222, etc.), and (ii) a second coupler, shown as first flange 230, extending from the first arm portion 220, proximate the second end 224.

As shown in FIGS. 2-4, the second arm portion 240 has a first end, shown as first end 242, and an opposing second end, shown as second end 244. As show in FIG. 4, the first end 242 defines a cavity, shown as extension cavity 246, positioned to slidably receive the projection 226 of the first arm portion 220 (e.g., forming a telescoping assembly, etc.). In other embodiments, the second end 224 of the first arm portion 220 defines the extension cavity 246 and the first end 242 of the second arm portion 240 has the projection 226. As shown in FIGS. 2-4, the second arm portion 240 includes (i) a third coupler, shown as second flange 250, extending from the second arm portion 240, proximate the first end 242, and (ii) a fourth coupler, shown as second bracket 252, coupled along the second arm portion 240 between the first end 242 and the second end 244.

In an alternative embodiment, the left lift arm 212 and the right lift arm 214 do not include the projection 226 or the extension cavity 246. In such an embodiment, the first arm portion 220 and the second arm portion 240 may be stacked (e.g., in a side-by-side arrangement, in a top-and-bottom arrangement, etc.) where the first end 242 of the second arm portion 240 over-retracts beyond the second end 224 of the first arm portion 220 and slides or translates therealong. The first arm portion 220 and the second arm portion 240 may be coupled together using a sliding or track mechanism (e.g., a slide assembly, a track assembly, etc.). In some embodiments, the second end 224 of the first arm portion 220 is positioned on the inside of the second arm portion 240. In some embodiments, the second end 224 of the first arm portion 220 is positioned on the outside of the first end 242 of the second arm portion 240. In some embodiments, the second end 224 of the first arm portion 220 is positioned on top of the first end 242 of the second arm portion 240. In some embodiments, the second end 224 of the first arm portion 220 is positioned below the first end 242 of the second arm portion 240.

As shown in FIGS. 1-4, the lift arm assembly 200 includes a pair of first actuators (e.g., hydraulic cylinders, pneumatic actuators, electric actuators, etc.), shown as pivot actuators 260, a pair of second actuators (e.g., hydraulic cylinders, pneumatic actuators, electric actuators, etc.), shown as extension actuators 270, an implement, shown as fork assembly 280, and a pair of third actuators (e.g., hydraulic cylinders, pneumatic actuators, electric actuators, etc.), shown as implement actuators 290. As shown in FIGS. 2-4, each of the pivot actuators 260 includes a first end, shown as first end 262, pivotally coupled to a side of the body 114 and/or the frame 112 at a second pivot point, shown as pivot actuator pivot 142, and an opposing second end, shown as second end 264, coupled to the first bracket 228 of the first arm portion 220. According to an exemplary embodiment, the pivot actuators 260 are positioned such that extension and retraction thereof pivots the right lift arm 210 and the left lift arm 212 about the lift arm pivot 140 between (i) a stowed or dumping position, as shown in FIG. 2, (ii) a working position, as shown in FIG. 4, and (iii) a transit position, as shown in FIG. 3. According to an exemplary embodiment, the transit position is a position between the stowed position and the working position that (i) provides greater operator visibility in front of the refuse vehicle 100 from the cab 116 relative to the working position and (ii) provides increased over-height clearance relative to the stowed position.

As shown in FIGS. 2-4, each of the extension actuators 270 includes a first end, shown as first end 272, coupled to the first flange 230 of the first arm portion 220, and an opposing second end, shown as second end 274, coupled to the second flange 250 of the second arm portion 240. In another embodiment, one or both of the extension actuators 270 include a rotatory actuator (e.g., an electric stepper motor, a hydraulic motor, etc.) and a translator. The translator may be a rack (e.g., such that the extension actuators 270 is a rack and pinion device, etc.), a cable, a chain, a bar, etc. According to the exemplary embodiment shown in FIGS. 1-4, the extension actuators 270 are positioned externally relative to the right lift arm 210 and the left lift arm 212 and extend between the second end 224 of the first arm portion 220 and the first end 242 of the second arm portion 240. In other embodiments, the extension actuators 270 are positioned internally within the right lift arm 210 and the left lift arm 212 and extend between the second end 224 of the first arm portion 220 and the first end 242 of the second arm portion 240. According to an exemplary embodiment, the extension actuators 270 are positioned such that extension and retraction thereof repositions (e.g., extends, retracts, etc.) the second arm portion 240 relative to the first arm portion 220 between a retracted position, as shown in FIGS. 2 and 3, and an extended position, as shown in FIG. 4. According to an exemplary embodiment, retracting the extension actuators 270 provides increased clearance when the lift arm assembly 200 is in the stowed position and increased reach when the lift arm assembly 200 is in the working position.

In some embodiments, the extension actuators 270 are configured to extend (e.g., automatically, etc.) in response to the pivot actuators 260 pivoting the right lift arm 210 and the left lift arm 212. By way of example, the extension actuators 270 may be configured to automatically extend based on a position of the lift arm assembly 200 relative to the cab 116 and/or the frame 112. For example, the extension actuators 270 may be configured to automatically extend as the fork assembly 280 reaches a position where the fork assembly 280 becomes close to the cab 116 (e.g., an upper trailing edge thereof, an upper leading edge thereof, etc.) as the lift arm assembly 200 is pivoted between the stowed position and the working position (e.g., to prevent the fork assembly 280 from hitting the cab 116, etc.). The extension actuators 270 may thereafter be configured to automatically retract after the cab 116 (e.g., the upper trailing edge thereof, the upper leading edge thereof, etc.) is cleared to reduce the overall envelope of the refuse vehicle 100. Accordingly, the lift arm assembly 200 facilitates using smaller lift arms on vehicles with large cabs without an issue (i.e., due to the extendibility provided by the lift arm assembly 200).

As shown in FIGS. 2-4, the fork assembly 280 includes a pair of pivotal couplers, shown as fork brackets 282, and a pair of forks, shown as forks 288, coupled to the fork brackets 282. According to an exemplary embodiment, one of the fork brackets 282 is coupled to a respective one of the right lift arm 210 and the left lift arm 212. The forks 288 are rotationally fixed with the fork brackets 282 (e.g., pivotal movement of the fork brackets 282 causes the forks 288 to pivot therewith, etc.), according to an exemplary embodiment.

As shown in FIGS. 2-4, each of the fork brackets 282 includes (i) a first coupling point, shown as first coupling point 284, pivotally coupled to the second end 244 of the second arm portion 240 at a third pivot point, shown as fork assembly pivot 248, and (ii) a second coupling point, shown as second coupling point 286. Each of the implement actuators 290 includes a first end, shown as first end 292, coupled to the second bracket 252 of the second arm portion 240 and an opposing second end, shown as second end 294, coupled to the second coupling point 286 of the fork brackets 282. According to an exemplary embodiment, the implement actuators 290 are positioned such that extension and retraction thereof pivots the fork brackets 282 and thereby the forks 288 about the fork assembly pivot 248 between a stowed position, as shown in FIGS. 2-4, and a working position, as shown in FIG. 1. In other embodiments, the fork assembly 280 is replaced or replaceable with a plow attachment.

As shown in FIG. 1, the lift arm assembly 200 is configured to engage with a container, shown as refuse container 300. By way of example, the refuse vehicle 100 may be driven up to a refuse pick-up location. The pivot actuators 260 may then be engaged to pivot the right lift arm 210 and the left lift arm 212 from the stowed position to the working position, as well as the implement actuators 290 may be engaged to pivot the forks 288 from the stowed position to the working position. The refuse container 300 may thereafter be retrieved from its storage location and brought proximate the lift arm assembly 200 or the refuse vehicle 100 may be driven up to the refuse container 300 such that the forks 288 align with fork tubes on the refuse container 300. A traditional refuse vehicle includes non-extendable lift arms and, therefore, in order to bring forks of the non-extending lift arms into engagement with fork tubes of a refuse container, the refuse vehicle has to be driven forward such that the forks are received by the fork tubes. The extendibility of the lift arm assembly 200 eliminates such a need to drive the refuse vehicle 100 forward to bring the forks 288 into engagement with the fork tubes of the refuse container 300. For example, once the fork tubes of the refuse container 300 are in alignment with the forks 288, the extension actuators 270 may be extended such that the second arm portion 240 extend from the first arm portion 220, bringing the forks 288 into engagement with the fork tubes of the refuse container 300. Engaging the forks 288 with the extension actuators 270 rather than by driving the refuse vehicle 100 forward may provide increased control, provide the ability to access refuse container 300 in tighter spaces, and/or provide still other advantages.

The pivot actuators 260 may thereafter be engaged to lift the refuse container 300 over the cab 116. According to an exemplary embodiment, the implement actuators 190 are positioned to articulate the forks 288, where such articulation may assist in tipping refuse out of the refuse container 300 and into the hopper volume of the refuse compartment 130 through an opening in the cover 136. According to an exemplary embodiment, a door, shown as top door 138, is movably coupled along the cover 136 to seal the opening, thereby preventing refuse from escaping the refuse compartment 130 (e.g., due to wind, bumps in the road, etc.). The pivot actuators 260 may thereafter be engaged to pivot the right lift arm 210 and the left lift arm 212 to return the empty refuse container 300 to the ground. The extension actuators 270 may then be engaged to retract the forks 288 from the fork tubes of the refuse container 300 (e.g., without having to drive the refuse vehicle 100 in reverse, etc.).

Figure 5:
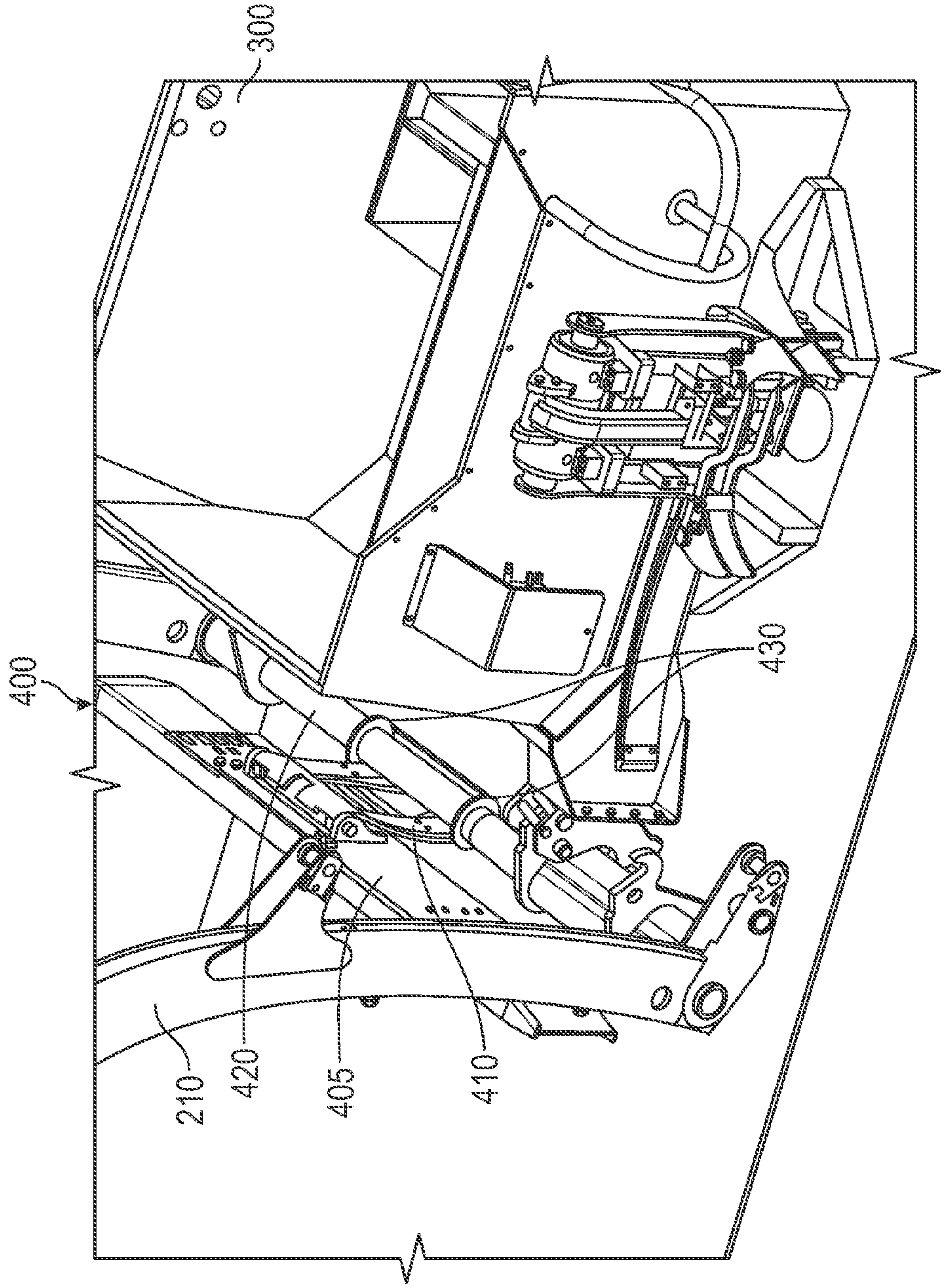
FIG. 5 is a side view of a lateral stabilizer assembly in a stowed positon, according to an exemplary embodiment.
Figure 6:
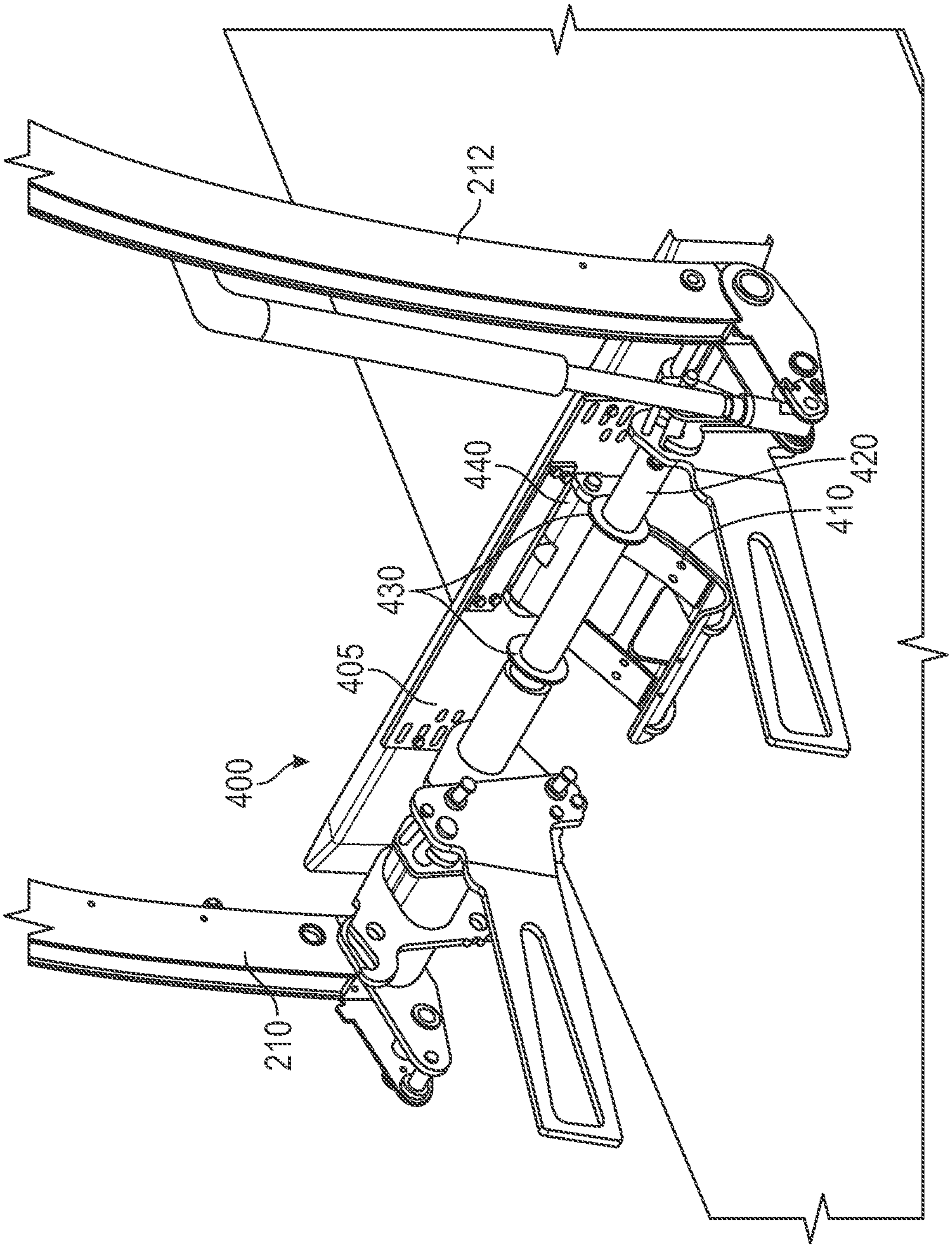
FIG. 6 is a side view of a lateral stabilizer assembly of FIG. 5 in an intermediate position, according to an exemplary embodiment.
Figure 7:
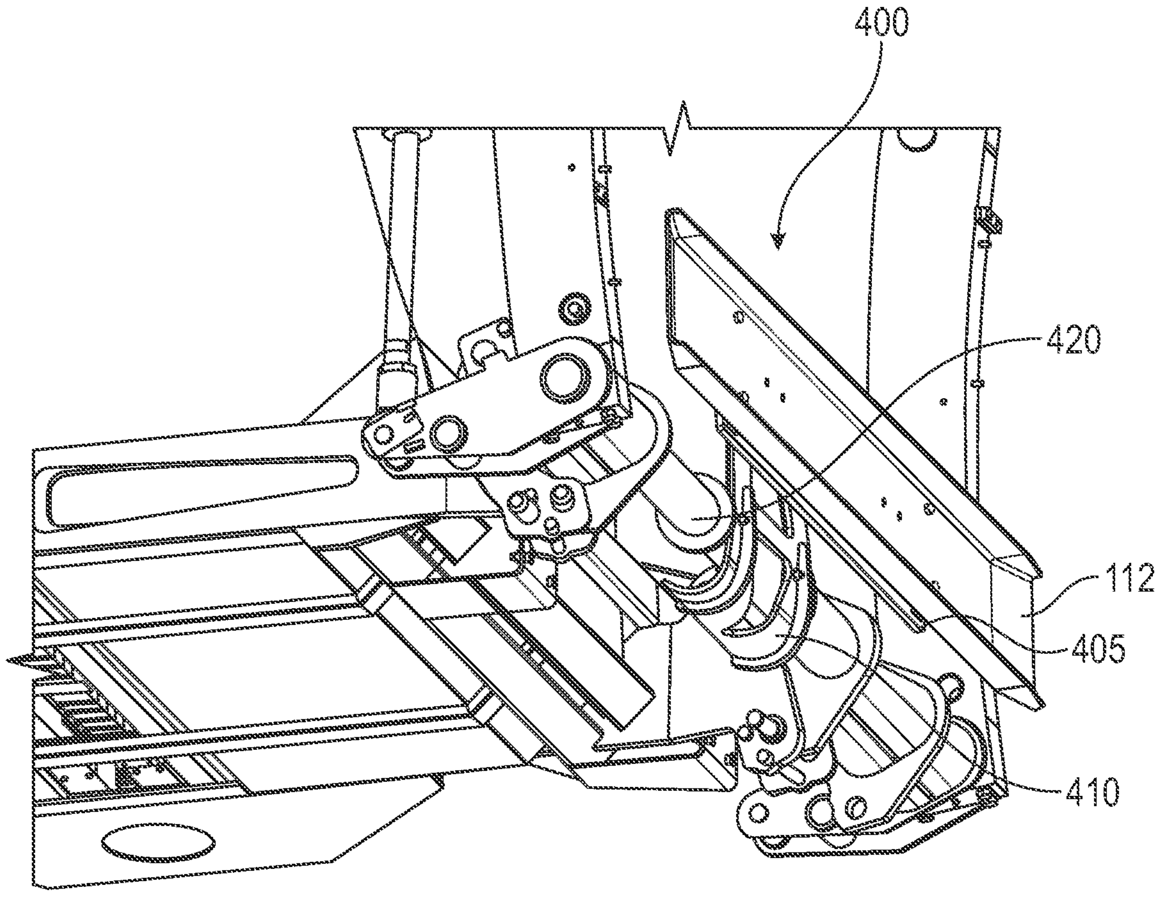
FIG. 7 is a rear, perspective view of a lateral stabilizer assembly of FIG. 5 in a stowed position, according to an exemplary embodiment.

Referring now to FIGS. 5-7, a detailed portion of the refuse vehicle 100 of FIG. 1 is shown. The refuse vehicle 100 comprises a lateral stabilizer assembly 400 fixedly coupled to the front of the refuse vehicle 100. The lateral stabilizer assembly 400 is fixedly coupled to the front of the refuse vehicle 100 by a backer plate 405. The backer plate 405 is disposed along at least a portion of the front bumper of the refuse vehicle 100. In some embodiments, the lateral stabilizer assembly 400 may be coupled to the rear of the refuse vehicle 100. The lateral stabilizer assembly 400 is defined between the right lift arm 210 and the left lift arm 212. In some embodiments, the lateral stabilizer assembly 400 is defined outside of the right lift arm 210 and the left lift arm 212. The lateral stabilizer assembly 400 is positioned at the midpoint of the refuse vehicle 100 (e.g., positioned halfway between the right lift arm 210 and the left lift arm 212). In some embodiments, the lateral stabilizer assembly 400 is not positioned at the midpoint of the refuse vehicle 100.

The lateral stabilizer assembly 400 is configured to prevent or prohibit horizontal sway in the refuse container 300. In some embodiments, the lateral stabilizer assembly 400 may prohibit vertical sway in the refuse container 300. In still some embodiments, the lateral stabilizer assembly 400 may prohibit both horizontal and vertical sway in the refuse container 300. The lateral stabilizer assembly 400 comprises a lateral stabilizer 410 coupled to both the lateral stabilizer assembly 400 and a fork tube 420. The lateral stabilizer 410 is configured to be selectively coupled to the fork tube 420, where the lateral stabilizer 410 can be engaged and disengaged by positioning the lift arm assembly between the working position and the transit position. In some embodiments, the lateral stabilizer 410 may be selectively engaged and disengaged by a controlled device configured to actuate the lateral stabilizer 410 in various configurations (e.g., motor, user input, etc.).

The lift arm assembly 200 is selectively repositionable between the working position and the transit position. When the lift arm assembly 200 is in the working position, the fork tube 420 disengages from the lateral stabilizer 410. In this position, the refuse container 300 is subject to horizontal sway. When the lift arm assembly 200 is in the transit position, the fork tube 420 engages the lateral stabilizer 410. In this position, the lateral stabilizer 410 interfaces with a set of stops, shown as bump plates 430, disposed on either end of the fork tube 420. The bump plates 430 are fixedly coupled to the fork tube assembly on either end where the lateral stabilizer 410 is selectively coupled. The bump plates 430 are configured to prevent the fork tube 420 from translating in the horizontal direction. In some embodiments, the bump plates 430 are defined along the circumference of the fork tube 420. In still some embodiments, the bump plates are defined along a portion of the fork tube 420. The bump plates 430 are further defined to be a set of bump plates, where one bump plate is positioned on each end of the fork tube 420. In some embodiments, there may be multiple sets of bump plates 430 positioned along the fork tube 420.

Referring to FIG. 6, an orthogonal view of the lift arm assembly 200 of FIG. 1 is shown. The lateral stabilizer 410 includes a spring 440 positioned between each end of the lateral stabilizer 410. The spring 440 is coupled to both the lateral stabilizer 410 and the backer plate 405. The spring 440 is configured to position the lateral stabilizer 410 in an extended positon, where the lateral stabilizer 410 is distal to the backer plate 405. When the lift arm assembly 200 is lowered into the transit positon, the fork tube 420 engages the lateral stabilizer 410 in a retracted position, where the lateral stabilizer 410 is proximal to the backer plate 405. When the lift arm assembly 200 is raised such that the fork tube 420 disengages from the lateral stabilizer 410, the spring 440 positions the lateral stabilizer 410 back into the extended position. In some embodiments, the lateral stabilizer 410 is in a fixed position, proximal to the backer plate 405. Thus, the spring 440 will not selectively reposition the lateral stabilizer 410 when engaging or disengaging the lift arm assembly 200. The lateral stabilizer 410 is further defined to be a spring loaded lateral stabilizer, where the spring 440 is defined to be the prime mover positioning the lateral stabilizer 410 between the extended position and the retracted position.

The lateral stabilizer 410 is configured to rotate (e.g., pivot) along an axis, shown as rotational axis 445. The rotational axis 445 extends along the length of the spring in a X-X direction. In some embodiments, the rotational axis 445 is not disposed along the X-X direction. The rotational axis 445 is further defined to be parallel to the top edge of the backer plate 405 and perpendicular at least one side edge of the backer plate 405. In some embodiments, the rotational axis 445 may not be parallel to the top edge of the backer plate 405. In some embodiments, the rotational axis 445 may not be perpendicular to at least one side edge of the backer plate 405. In some embodiments, the rotational axis 445 may not be parallel to the top edge of the backer plate 405 or perpendicular to at least one of the side edge of the backer plate 405.

Referring to FIG. 7, a rear, perspective view of the lateral stabilizer assembly 400 of FIG. 5 is shown. The lift arm assembly 200 is shown in an intermediate position (e.g., the lift arm assembly 200 is not in the working position or the transit position). In such an embodiment, the lateral stabilizer 410 is also in an intermediate position, where the lateral stabilizer 410 is in neither the extended or retracted position. The fork tube 420 is configured to be in contact with the top of the lateral stabilizer 410. This orientation is configured to be a guide for the retracted position and the extended position. Lowering the lift arm assembly 200 will completely position the fork tube 420 within the lateral stabilizer 410. Raising the lift arm assembly 200 will completely position the fork tube 420 away from the lateral stabilizer 410 (e.g., the fork tube 420 will no longer be in contact with the lateral stabilizer 410). In some embodiments, the fork tube 420 will not be in contact with the lateral stabilizer 410 when the lift arm assembly 200 is in the intermediate position.

Figure 8:
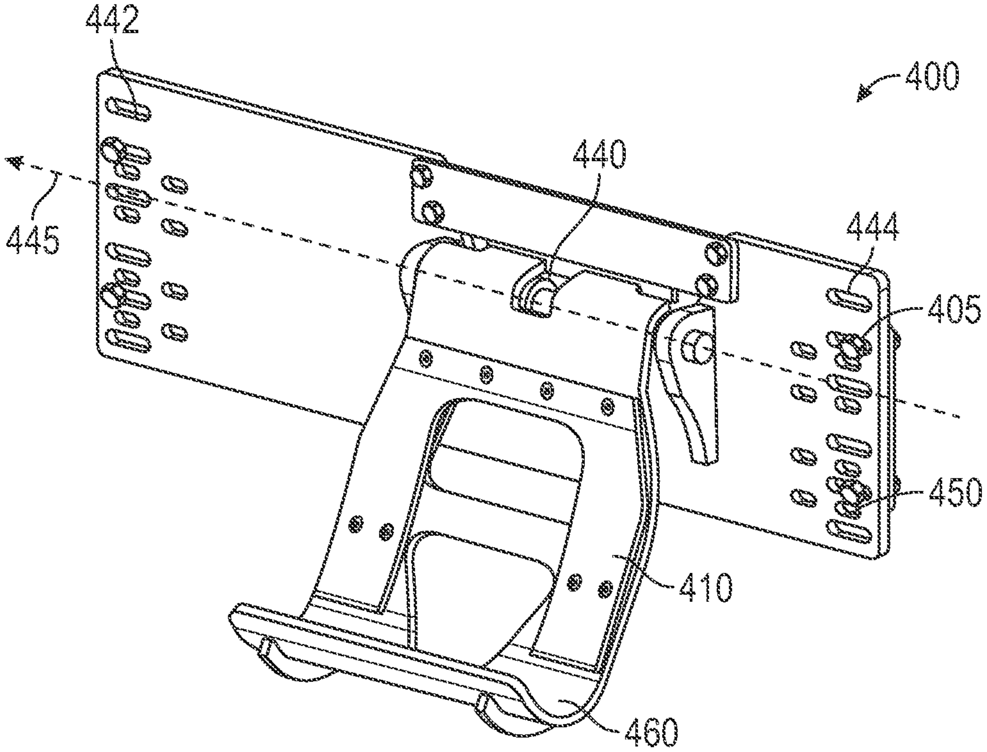
FIG. 8 is a perspective view of a lateral stabilizer, according to an exemplary embodiment.

Referring now to FIG. 8, an orthogonal view of the lateral stabilizer assembly 400 of FIG. 5 is shown. The backer plate 405 further includes a first backer plate end 442 positioned proximal to the right lift arm 210 and a second backer plate end 444 positioned proximal to the left lift arm 212. In some embodiments, the first backer plate end 442 and the second backer plate end 444 are both positioned proximal to the right lift arm 210. In still some embodiments, the first backer plate end 442 and the second backer plate end 444 are both positioned proximal to the left lift arm 212. The lateral stabilizer 410 is coupled to the front of the refuse vehicle 100 through the mounting interfaces 450. The mounting interfaces 450 may include slots or holes configured to accept a bolt therebetween, and are defined within the body of the backer plate 405. In some embodiments, the mounting interfaces 450 may include additional mounting features (e.g., hooks, latches, etc.). The mounting interfaces 450 are defined to be positioned at both the first backer plate end 442 and the second backer plate end 444. In some embodiments, the mounting interfaces 450 are only positioned at one of the first backer plate end 442 and the second backer plate end 444. The lateral stabilizer assembly 400 may include a plurality of mounting interfaces 450 configured to fixedly couple the backer plate 405 to the refuse vehicle 100. In some embodiments, the lateral stabilizer assembly 400 may only include one mounting interface 450. The lateral stabilizer 410 further includes a down stop 460 positioned at the bottom of the lateral stabilizer 410. The down stop 460 is configured to provide support to the fork tube 420, when the lift arm assembly 200 is in the transit position (e.g., lowered). The down stop 460 is further defined to have a radius. The radius of the down stop 460 is configured to be larger than the radius of the fork tube 420 such that at least a portion of the fork tube 420 is selectively coupled to a portion of the lateral stabilizer 410. In some embodiments, the down stop 460 may be defined to have a rectangular portion, where the fork tube 420 is configured to rest thereon.

Figure 9:
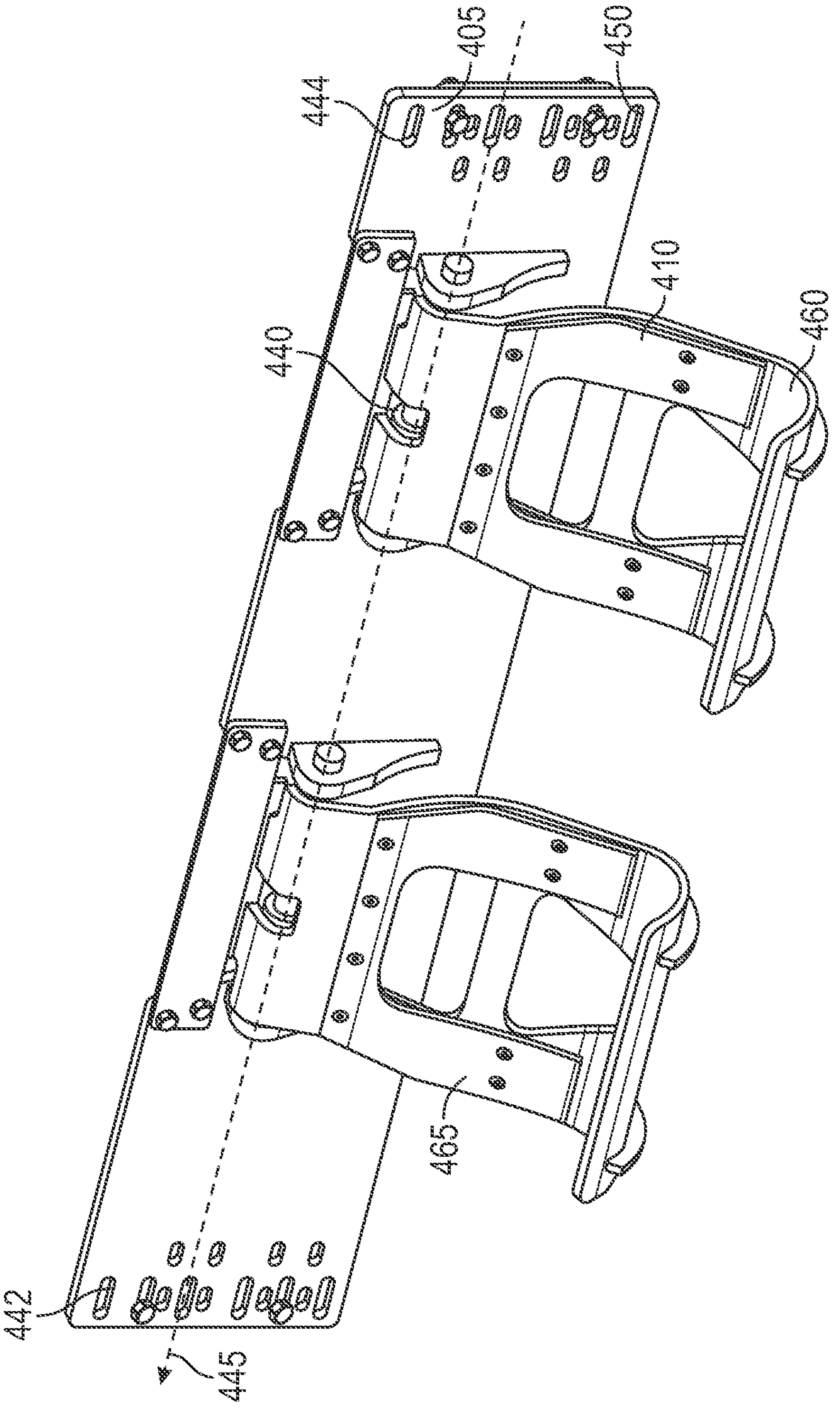
FIG. 9 is a perspective view of a lateral stabilizer, according to an exemplary embodiment.

Referring to FIG. 9, the lateral stabilizer assembly 400 of FIG. 5 is shown, according to an example embodiment. As shown, the lateral stabilizer assembly 400 may include a second lateral stabilizer 465, positioned below and along the length of the fork tube 420. The second lateral stabilizer 465 is defined to be similar to the lateral stabilizer 410. The second lateral stabilizer 465 may be selectively repositionable between the extended positon and the retracted position, such that lift arm assembly 200 is not able to horizontally sway when the second lateral stabilizer 465 is in the retracted position. In the retracted position, the second lateral stabilizer 465 is selectively coupled to the fork tube 420. The second lateral stabilizer 465 is defined to have a radius such that the fork tube 420 may rest within the second lateral stabilizer 465 when the lift arm assembly 200 is in the transit position.

In some embodiments, the second lateral stabilizer 465 is positioned above and along the length of the fork tube 420. The second lateral stabilizer 465 is defined to similar to the lateral stabilizer 410. The second lateral stabilizer 465 may be configured to provide additional support on the fork tube 420. The second lateral stabilizer 465 may be selectively repositionable between the extended positon and the retracted position, such that the lift arm assembly 200 is not able to vertically sway when the second lateral stabilizer 465 is in the retracted position. In the retracted position, the second lateral stabilizer 465 is selectively coupled to the fork tube 420.

Figure 10:
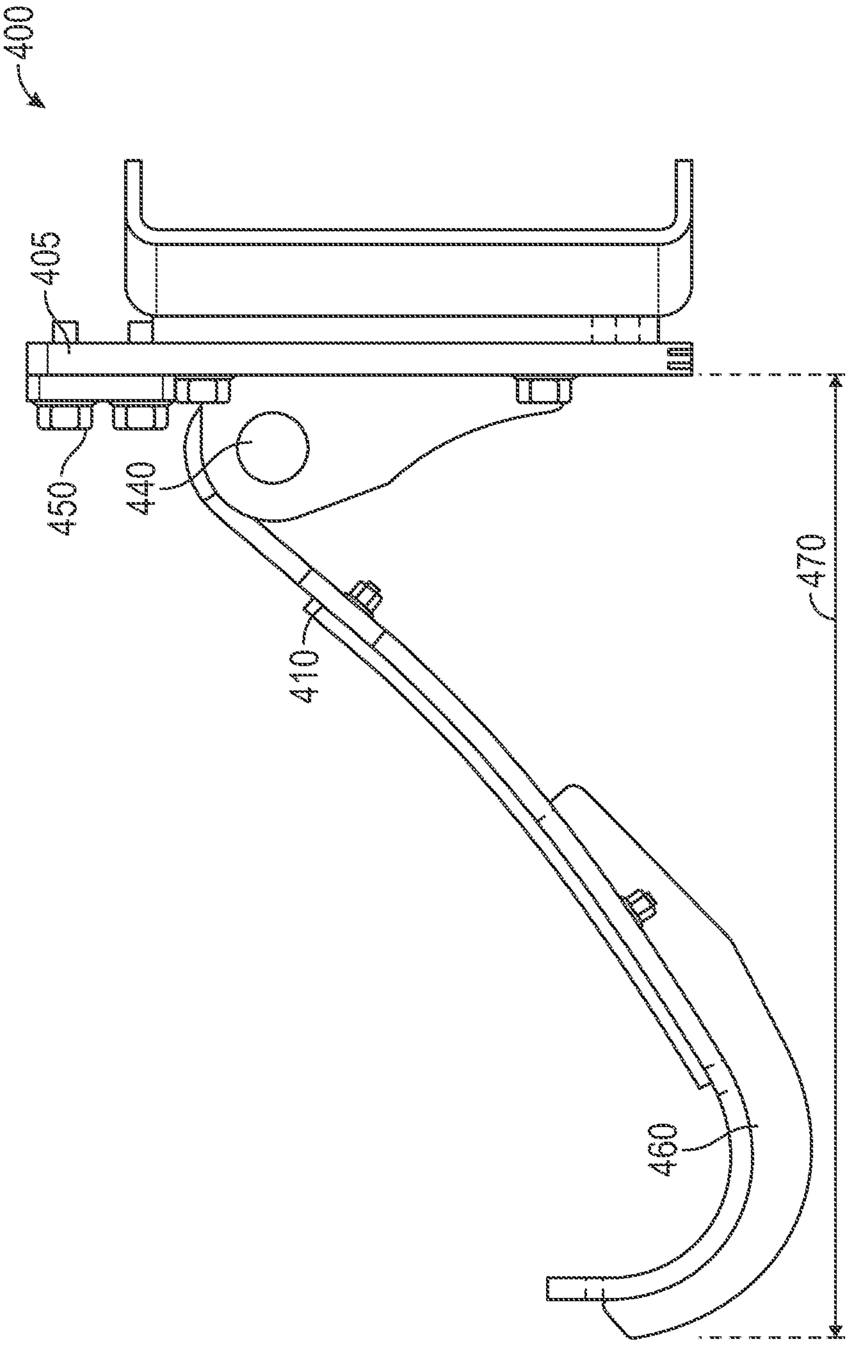
FIG. 10 is a side view of the lateral stabilizer of FIG. 8, shown in an extended position, according to an exemplary embodiment.
Figure 11:
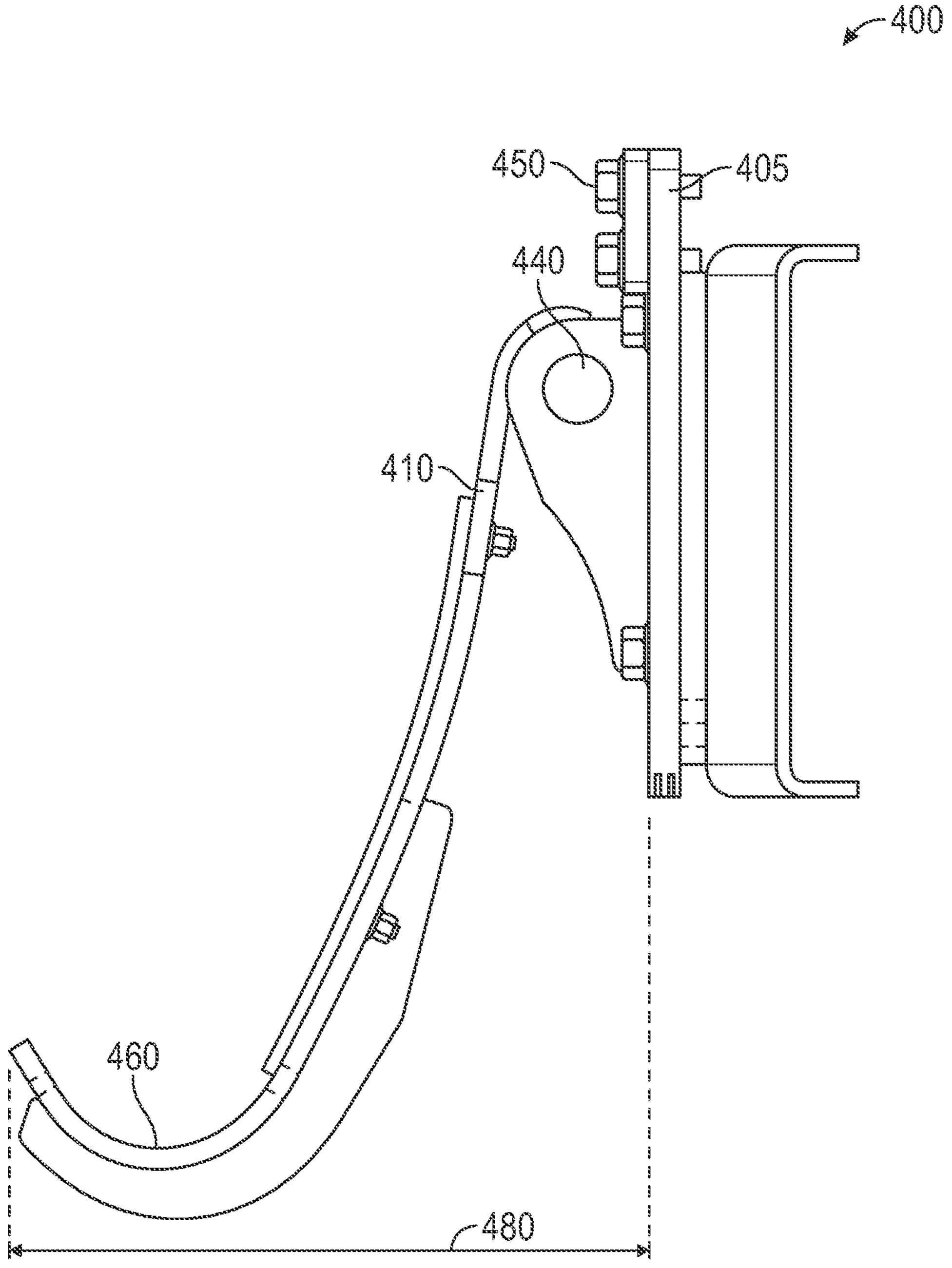
FIG. 11 is a side view of the lateral stabilizer of FIG. 8, shown in a retracted position, according to an exemplary embodiment.

Referring to FIGS. 10 and 11, a side view of the lateral stabilizer 410 is shown in the extended position and the retracted position. As shown, the lateral stabilizer 410 is in an extended position. In the extended position, the lateral stabilizer 410 is defined to be a first distance 470 from the backer plate 405. When the lateral stabilizer 410 is in the retracted position, the lateral stabilizer is defined to be a second distance 480 from the backer plate 405, where the first distance 470 is greater than the second distance 480. In some embodiments, the lateral stabilizer 410 is fixed, thus the first distance 470 is equal to the second distance 480. In still some embodiments, the first distance 470 is defined to be less than the second distance 480. In still some embodiments, the first distance 470 may be equal to the second distance 480 (e.g., the lateral stabilizer 410 is fixed). As shown, the down stop 460 is positioned closer to a ground surface (e.g., road, surface, etc.) when the lateral stabilizer 410 is in the retracted position. In some embodiments, the down stop 460 is positioned closer to the ground surface when the lateral stabilizer 410 is in the extended position.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the refuse vehicle 100 and the systems and components thereof as shown in the various exemplary embodiments is illustrative only. Additionally, any element disclosed in one embodiment may be incorporated or utilized with any other embodiment disclosed herein.

What is claimed is:

1. A refuse vehicle, comprising:
- a chassis;
- a body coupled to the chassis;
- a lift arm assembly coupled to at least one of the chassis or the body and selectively repositionable between a first position and a second position;
- a fork tube coupled to the lift arm assembly;
- a set of bump plates fixedly coupled to the fork tube; and
- a lateral stabilizer assembly coupled to at least one of the chassis or the body, the lateral stabilizer assembly comprising:
  - a lateral stabilizer selectively repositionable between an extended position and a retracted position;
  - a backer plate coupled to the chassis; and
  - a spring positioned between the lateral stabilizer and the backer plate, wherein the spring biases the lateral stabilizer in the extended position, wherein the lateral stabilizer is selectively repositionable between the extended position and the retracted position by pivoting about a rotational axis defined horizontally along a length of the spring, and
- wherein the lateral stabilizer is configured to support the fork tube when the lift arm assembly is in the first position, and wherein the lateral stabilizer assembly is configured to prevent lateral sway of the lift arm assembly when the lift arm assembly is in the first position by the lateral stabilizer abutting the set of bump plates.

2. The refuse vehicle of claim 1, wherein the lateral stabilizer is distal to the backer plate when in the extended position and proximal to the backer plate when in the retracted position.

3. The refuse vehicle of claim 1, wherein the first position is a transit position and the second position is a working position, and wherein the working position is defined to be any position when the lift arm assembly is not in the transit position.

4. The refuse vehicle of claim 3, wherein the lateral stabilizer is configured to support the fork tube when the lift arm assembly is in the transit position, such that a portion of the weight of the lift arm assembly is supported by the lateral stabilizer.

5. The refuse vehicle of claim 4, wherein the lateral stabilizer further comprises a down stop configured to support the fork tube when the lift arm assembly is in the transit position.

6. The refuse vehicle of claim 1, wherein the lift arm assembly further comprises a first arm and a second arm, and wherein the lateral stabilizer assembly is positioned within the first arm and the second arm, such that the lateral stabilizer is defined to be at the midpoint of the refuse vehicle.

7. The refuse vehicle of claim 1, wherein the lateral stabilizer assembly further comprises a second lateral stabilizer positioned adjacent to the lateral stabilizer and is configured to provide support to the fork tube when the lift arm assembly is in the first position.

8. A lateral stabilizer assembly, comprising:
- a lateral stabilizer selectively repositionable between an extended position and a retracted position, the lateral stabilizer comprising a down stop;
- a backer plate comprising one or more apertures, the lateral stabilizer mounted to the backer plate; and
- a spring positioned between the lateral stabilizer and the backer plate, wherein the spring extends along a rotational axis that is defined horizontally along a length of the spring, and wherein the lateral stabilizer is selectively repositionable between the extended position and the retracted position by pivoting about the rotational axis;
- wherein the down stop is configured to support a fork tube when a lift arm assembly is in a transit position, and wherein the lateral stabilizer assembly is configured to prevent lateral sway of the lift arm assembly by abutting a set of bump plates positioned on the fork tube.

9. The lateral stabilizer assembly of claim 8, wherein the set of bump plates are positioned a distance away from one another, and wherein the lateral stabilizer is positioned within the set of bump plates.

10. The lateral stabilizer assembly of claim 8, wherein the spring biases the lateral stabilizer in the extended position when the lift arm assembly is not in the transit position, such that the lateral stabilizer is only in the retracted position when the lift arm assembly is in the transit position.

11. The lateral stabilizer assembly of claim 8, further comprising a second lateral stabilizer positioned adjacent to the lateral stabilizer and configured to support the fork tube when the lift arm assembly is in the transit position.

12. A refuse vehicle, comprising:
- a chassis;
- a body coupled to the chassis;
- a lift arm assembly coupled to at least one of the chassis or the body and selectively repositionable between a transit position and a working position, the lift arm assembly comprising:
  - a first arm;
  - a second arm; and
  - an implement coupled to the first arm and the second arm;
- a fork tube positioned between the first arm and the second arm;
- a set of bump plates fixedly coupled to the fork tube and positioned a distance away from one another; and
- a lateral stabilizer assembly coupled to at least one of the chassis or the body, the lateral stabilizer assembly comprising:
  - a lateral stabilizer selectively repositionable between an extended position and a retracted position, the lateral stabilizer comprising a down stop;
  - a backer plate comprising one or more apertures, the lateral stabilizer mounted to the backer plate; and
  - a spring positioned between the lateral stabilizer and the backer plate, wherein the lateral stabilizer is selectively repositionable between the extended position and the retracted position by pivoting about a rotational axis defined horizontally along a length of the spring, and wherein the spring is configured to bias the lateral stabilizer toward the extended position.

13. The refuse vehicle of claim 12, wherein the lateral stabilizer is configured to support the fork tube when the lift arm assembly is in the transit position.

14. The refuse vehicle of claim 13, wherein the lateral stabilizer assembly is configured to prevent lateral sway of the lift arm assembly when the lift arm assembly is in the transit position by the lateral stabilizer abutting the set of bump plates.

15. The refuse vehicle of claim 12, wherein the lateral stabilizer assembly is positioned between the first arm and the second arm.

16. The refuse vehicle of claim 12, wherein the lateral stabilizer assembly further comprises a second lateral stabilizer positioned adjacent to the lateral stabilizer and is configured to support the fork tube when the lift arm assembly is in the transit position.

* * * * *